June 15, 1971  U. P. TRUDEAU  3,585,017

MULTIPLE MOLD CHARGE HANDLING APPARATUS

Filed Nov. 9, 1967

INVENTOR.
URBAN P. TRUDEAU
BY
ATTORNEYS 3,585,017
MULTIPLE MOLD CHARGE HANDLING APPARATUS
Urban P. Trudeau, Toledo, Ohio, assignor to
Owens-Illinois, Inc.
Filed Nov. 9, 1967, Ser. No. 681,650
Int. Cl. C03b 5/32
U.S. Cl. 65—304                                          5 Claims

ABSTRACT OF THE DISCLOSURE

Apparatus for simultaneously delivering three mold-charges or "gobs" of molten glass to triple-cavity blank molds of a container forming machine, such comprising three scoops arranged in tandem and mounted for oscillation horizontally on vertical axes individual to the receiving upper ends of the scoops and coaxial with three bottom outlet orifices of a conventional flow feeder, the scoops being suspended from cross-heads interconnected at their ends by reciprocable parallel links so that the scoops can be moved to feed glass to several molds, one at a time, in a predetermined sequence.

BACKGROUND OF THE INVENTION

The present invention may well be operated by the web-cam and sector gear mechanism disclosed in my co-pending application for U.S. patent, Ser. No. 681,651, filed Nov. 9, 1967.

Whereas the co-pending case pertains to double-gob feeding, in the present application the disclosed device is designed to simultaneously direct three "gobs" of glass to a single blank mold. In both instances the basic operating mechanism is synchronized with the "gob" feeding and severing apparatus, as well as with the cycle of the forming machine operations. Such, however, is not a part of my herein claimed invention.

An important object of my invention is the provision of a novel, relatively simple apparatus for simultaneously directing three "gobs" or mold charges of molten glass to each of a plurality of triple-cavity blank or parison molds of a forming machine.

Another object of my invention is the provision of apparatus of the above-indicated type, wherein three scoops are arranged in tandem, with their upper charge receiving ends coaxial with three bottom outlet orifices of a conventional or any preferred type of "gob" feeder, the scoops being mounted for oscillation horizontally on said axes so as to register their lower discharge ends successively with the upper receiving ends of sets of inclined chutes leading to the blank molds, in the manner revealed in said pending application.

A further object of my invention is the provision of novel parallel-link mechanism for supporting the scoops or troughs and operable to shift the scoops in unison from one set of chutes to another.

Other objects will be in part apparent and in part pointed out hereinafter.

BRIEF DESCRIPTION OF THE DRAWINGS

In the accompanying drawings forming a part of my application.

In the illustrated specific form of my invention, it comprises essentially three elongated curved scoops 10, or troughs, with their longitudinal axes in vertical planes, these scoops being in tandem and each having an upper mold charge or "gob" inlet or receiving end in the form of a vertical cylinder 11, or sleeve. The lower discharge end 12 of each scoop, as indicated above, is intended for register with the receiving end of one of a set of three chutes (not shown), leading to one of the forming machine blank molds (not shown). There is a set of three such chutes for each blank mold of the forming machine and the three scoops 10 are moved in unison on their vertical axes to bring them into alignment with the several sets of chutes in a predetermined sequence synchronized with the segregated "gob" or mold charge formation and operation of the forming machine (not shown).

Figure 1:
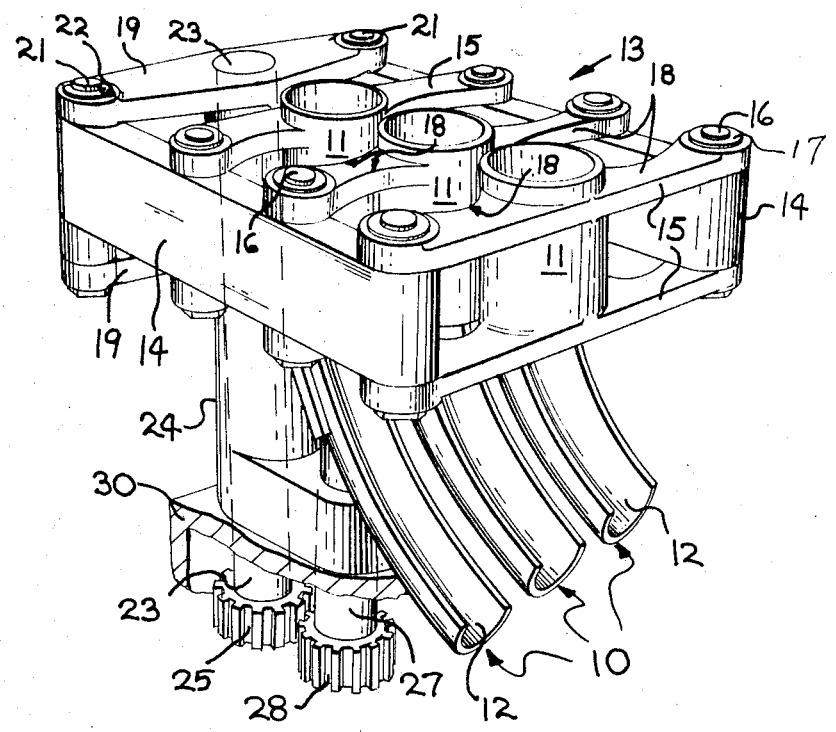
FIG. 1 is a perspective view of my invention.
Figures 2, 3:
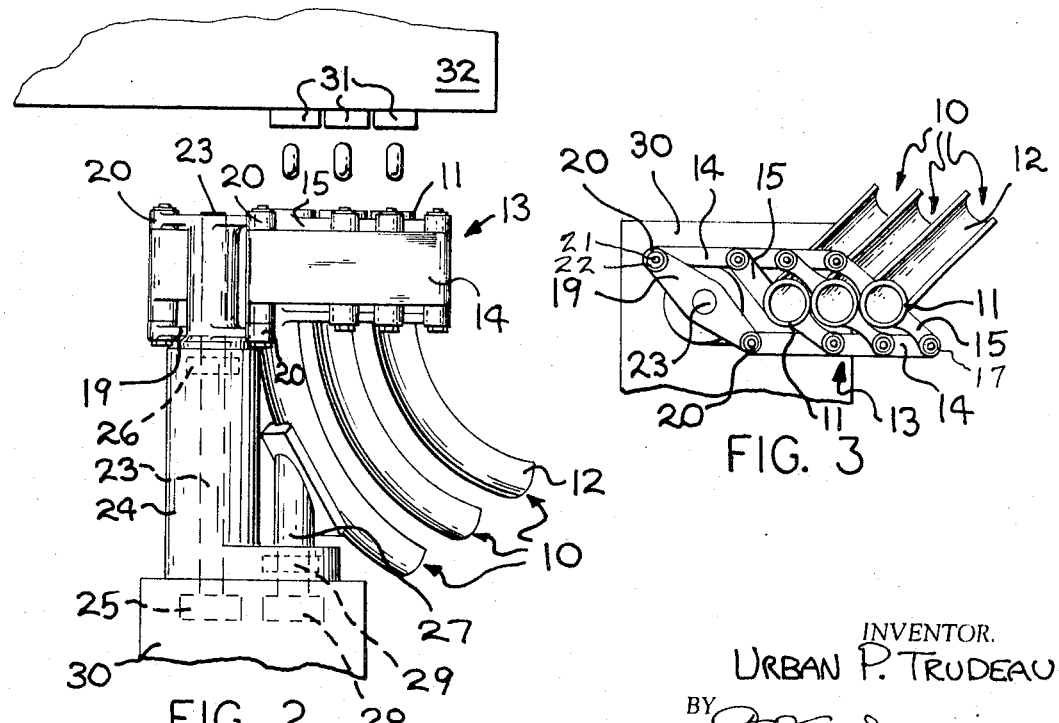
FIG. 2 is a side elevational view thereof beneath a triple-gob feeder.
FIG. 3 is a top plan view.

The scoops 10 (FIG. 1) are suspended from a parallel-link unit 13 comprising a pair of parallel horizontal links 14, or bars, which are spaced apart in a horizontal plane. The open-ended cylinder 11 at the upper end of each scoop 10 is provided with vertically spaced-apart pairs of radial arms 15 which may be formed as integral parts of the cylinder and scoop. These arms 15, at their free ends, straddle the links 14, being pivoted thereto by bolts 16, or pins, with snap lock rings 17, or the like, releasably holding these bolts in place. It will be observed that the contour of these arms 15 (FIGS. 1 and 3) is such as to provide side recesses 18 which accommodate the cylinders 11 when the scoops are moved to or near their extreme limits of travel, one being indicated in FIG. 3.

At that end remote from the uppermost, or foremost scoop 10 two parallel, vertically spaced-apart, bars forming a cross-head 19 have their ends 20 straddling the two links 14, being pivoted thereto by vertical pivot pins 21, or bolts. Snap lock rings 22 secure these pins in place. Medially their ends the cross-head forming bars are firmly secured to the upper end of a vertical shaft 23 which extends downwardly through a housing 24 and at its lower end carries a pinion 25 or gear which is intended to mesh with a sector gear as in my co-pending case identified above. A thrust-bearing 26 near its upper end holds the shaft 23 against axial movement, thus enabling the shaft to support the entire assemblage. A second vertical shaft 27, or its equivalent, disposed parallel to the supporting shaft 23, is secured at its upper end to the rear-most scoop 10 and at its lower end carries a pinion 28, or gear, intended to mesh with the sector gear (not shown) which engages the other pinion 25. A thrust-bearing 29 supports the shaft 27 against axial movement. A gear box 30 encloses the two pinions 25 and 28 and the lower ends of the two shafts 23 and 27.

With the above tsructure it is apparent that incident to movement of the sector gear meshing with the two pinions 25 and 28, the cross-head 19 will move about the axis of the shaft 23, causing shifting of the links 14 in opposite directions a controlled, predetermined extent, thus changing the angular positions of the scoops 10. In this fashion the three scoops are moved in unison from one set of chutes to another, bringing the scoops into register with the chutes at each station. The second shaft 27 positively prevents horizontal rocking of the parallel-link assemblage on the axis of the first shaft 23 and thus insures axial registration, at all times, of the scoop cylinders 11 with the discharge orifice bushings 31 of the feeder 32. Without this shaft 27, or its equivalent, it is apparent that oscillation of the support shaft 23 would swing the entire assemblage on the axis of shaft 23, with no relative shifting of the links 14.

Modifications may be resorted to within the spirit and scope of the appended claims.

I claim:

1. In combination with apparatus for feeding plural mold charges from a plural orifice glass feeder to a plurality of forming machines, of charge distributing means interposed between said feeder and said machines adapted to handle plural charges at the same time, said distributing means comprising an assemblage of plural, curved scoops equal in number to the number of feeder orifices, means mounting said assemblage of scoops such that each scoop has an upper charge receiving end in axial alignment with a feeder orifice and a lower end, said mounting means further comprising parallel-linkage mounted about and interconnecting said scoops for oscillating movement in unison such that the upper end of each said scoop remains in substantially coaxial alignment with its respective orifice and the lower ends of said scoops are movable in unison to successive positions for delivering a plurality of charges equal in number to said scoops, and means connected to said mounting means for oscillating said scoops.

2. The combination as defined in claim 1, wherein said mounting means further comprises a horizontal cross-head pivoted at its ends to the parallel linkage means, a vertical shaft connected at its upper end to the cross-head medially its length to support said linkage means, and said means for oscillating said linkage comprising said shaft.

3. The combination as defined in claim 1, wherein said parallel linkage means comprises two horizontally spaced-apart, parallel horizontal links, opposed horizontal arms rigidly connected to the upper areas of the scoops and means pivotally connecting the free ends of said arms to the links.

4. The combination as defined in claim 1, wherein the parallel linkage means comprises a horizontal link spaced from each side of the aligned upper ends of the scoops, opposed pairs of radial arms at the upper end of each scoop, said arms having free ends straddling the links, vertical pivot pins inter-connecting said free ends and the links and said means for oscillating the linkage comprises a horizontal cross-head pivoted at opposed free ends to the links near an end scoop, a rotatable, vertical shaft connected at its upper end to the medial point of said cross-head thereby supporting the assemblage of scoops.

5. The combination as defined in claim 1, wherein said means for maintaining alignment comprises a rotatable vertical shaft mounted parallel to the first-named shaft and connected at its upper end to an adjacent scoop.

References Cited

UNITED STATES PATENTS 2,926,457   3/1960   Trudeau _____ 65—223
3,333,938   8/1967   Zappia _____ 65—225

ARTHUR D. KELLOGG, Primary Examiner

U.S. Cl. X.R.
65—225; 193—23